(12) United States Patent
Horne

(10) Patent No.: US 10,188,091 B2
(45) Date of Patent: Jan. 29, 2019

(54) PORTABLE LIGHT AND INSECT EXTERMINATION DEVICE

(71) Applicant: Alliance Sports Group, L.P., Grand Praire, TX (US)

(72) Inventor: Gregory Lee Horne, Euless, TX (US)

(73) Assignee: alliance sports group, l.p., Grand Prairie, TX (US)

(*) Notice: Subject to any disclaimer, the term of this patent is extended or adjusted under 35 U.S.C. 154(b) by 0 days.

(21) Appl. No.: 15/995,426

(22) Filed: Jun. 1, 2018

(65) Prior Publication Data

US 2018/0343846 A1 Dec. 6, 2018

Related U.S. Application Data

(63) Continuation-in-part of application No. 15/916,433, filed on Mar. 9, 2018.

(60) Provisional application No. 62/513,542, filed on Jun. 1, 2017.

(51) Int. Cl.
*A01M 1/04* (2006.01)
*A01M 1/22* (2006.01)

(52) U.S. Cl.
CPC .............. *A01M 1/04* (2013.01); *A01M 1/223* (2013.01)

(58) Field of Classification Search
CPC .................................. A01M 1/04; A01M 1/223
See application file for complete search history.

(56) References Cited

U.S. PATENT DOCUMENTS

| 6,055,766 | A  | 5/2000  | Nolen et al. |
| 6,134,826 | A  | 10/2000 | Mah          |
| 7,360,921 | B1 | 4/2008  | Greenspon    |
| 2006/0262526 | A1 | 11/2006 | Dubois   |
| 2008/0034642 | A1 | 2/2008  | Chen     |
| 2017/0002994 | A1 | 1/2017  | Fisher et al. |

FOREIGN PATENT DOCUMENTS

| CN | 204014833 U | 12/2014 |
| EP | 2158141 B1 | 5/2013 |
| GB | 2540530 A | 1/2017 |
| KR | 20-2013000688 | 12/2013 |
| KR | 10-1545083 B1 | 8/2015 |
| KR | 10-1711395 B1 | 3/2017 |

OTHER PUBLICATIONS

International Search Report dated Sep. 24, 2018, in International Application No. PCT/US18/35599, filed Jun. 1, 2018; 16 pages.

*Primary Examiner* — Thomas M Sember
(74) *Attorney, Agent, or Firm* — Thorpe North & Western LLP

(57) ABSTRACT

A handheld lighting apparatus is disclosed having a top housing coupled to a first light source and an electrical grid configured to distribute a quantity of electricity to an object that contacts adjacent portions of the grid. The top housing is slidably mounted to a bottom housing having a cavity therein, the cavity being configured to receive the electrical grid assembly therein. The first light source emits light ranging from about 400 nm to about 720 nm in a first mode and light ranging from about 315 nm to about 400 nm in a second mode. A second light source is disposed about the bottom housing configured to propagate light in a direction that is parallel to a longitudinal direction of the lighting apparatus.

16 Claims, 4 Drawing Sheets

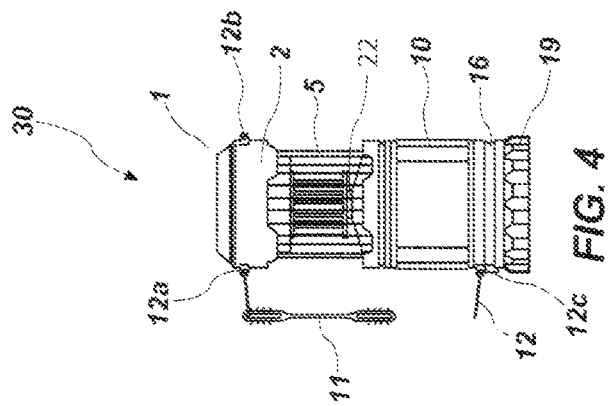
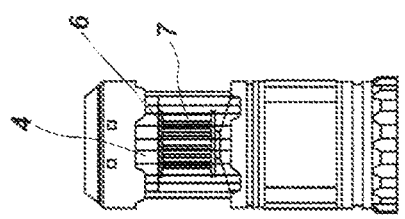
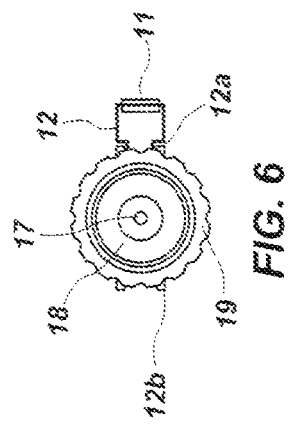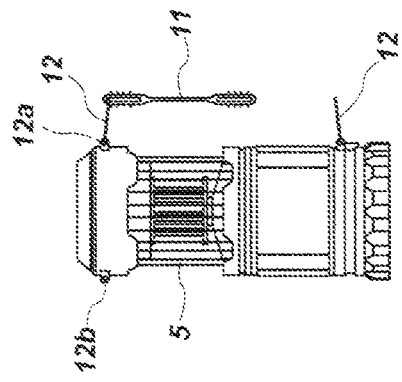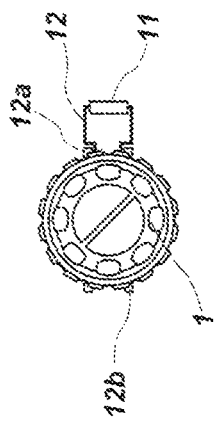
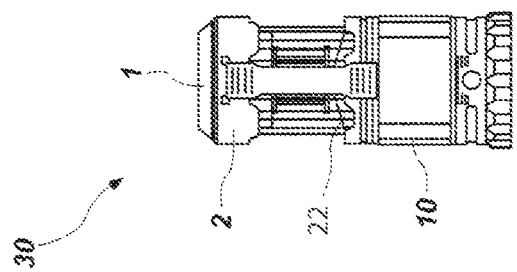

PORTABLE LIGHT AND INSECT EXTERMINATION DEVICE

PRIORITY

This application claims priority to U.S. Application Ser. No. 62/513,542 entitled "Portable Light and Insect Extermination Device" filed on Jun. 1, 2017 which is incorporated herein by reference in its entirety. This application also claims priority to U.S. application Ser. No. 15/916,433 entitled "Method and Apparatus for Controlling Lighting Modules of a Multi-Element Portable Light" filed on Mar. 9, 2018 which is incorporated herein by reference in its entirety.

FIELD

The present technology relates to lighting devices. Specifically, multiple use lighting devices and methods of operation.

BACKGROUND

UV lighting devices used to attract insects for extermination have been previously produced. A limitation with prior art extermination devices is that the UV light and extermination grid are always exposed which can be unsightly and unsanitary if the device is being transported near food. Also, in some devices, the light may be too bright for indoor use and/or too bright for continued use and/or is limited in its versatility to the end user.

BRIEF DESCRIPTION OF THE DRAWINGS

FIG. 1 is a side view of an extendable flashlight/insect extermination device in an "open" configuration in accordance with one aspect of the technology;

FIG. 2 is an additional side view of the device of FIG. 1;
FIG. 3 is an additional side view of the device of FIG. 1;
FIG. 4 is an additional side view of the device of FIG. 1;
FIG. 5 is a top view of the device of FIG. 1;
FIG. 6 is a bottom view of the device of FIG. 1.

DESCRIPTION OF EMBODIMENTS

Figure 7:
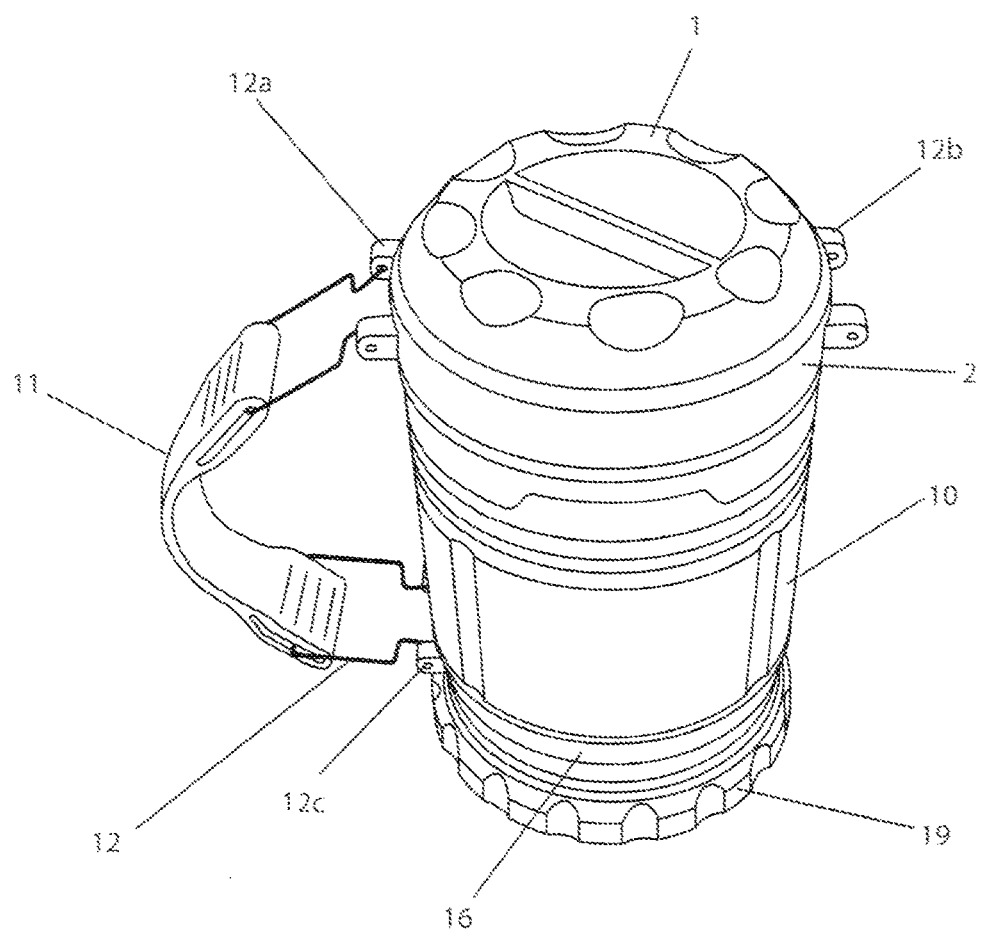
FIG. 7 is a top perspective view of an extendable flashlight/insect extermination device in a "closed" configuration in accordance with one aspect of the technology.
Figure 8:
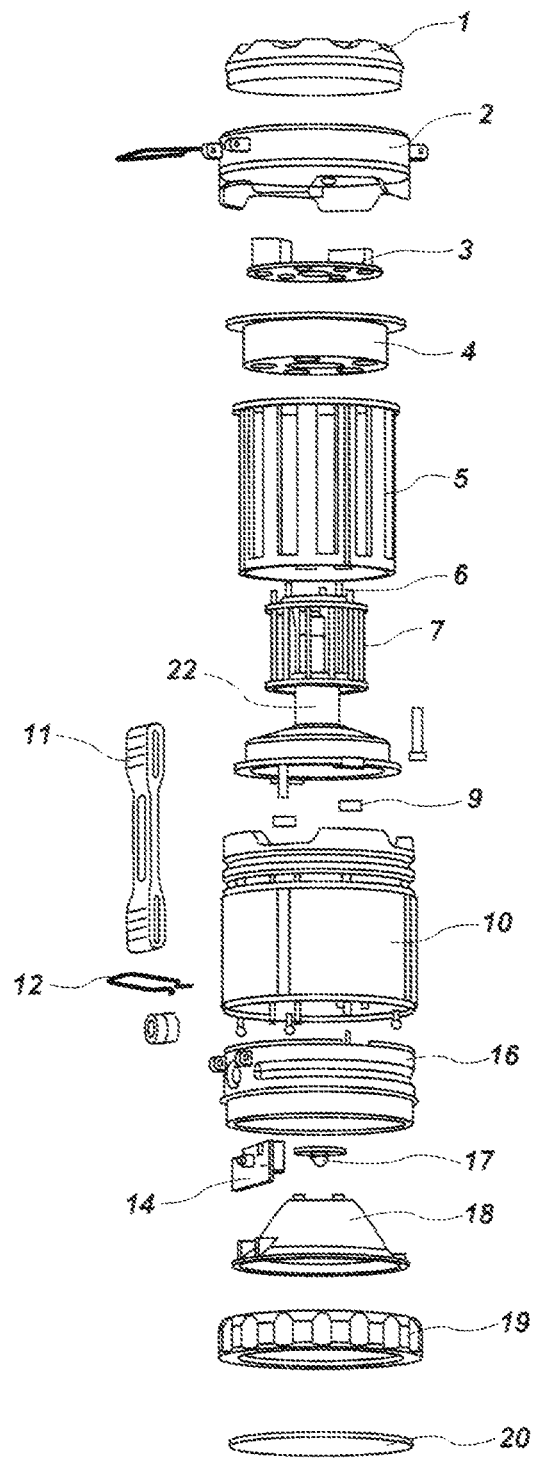
FIG. 8 is an exploded view of an extendable flashlight/insect extermination device in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

The term "flashlight" as used herein is used as an example of a lighting device that may employ the technology herein but should not be construed as limiting what kinds of lighting devices may employ the current technology. As such, the term flashlight should be broadly construed to include lanterns, headlamps, and other various lighting devices.

An initial overview of the technology is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the current technology improves electrical discharge insect control systems (also called "bug zappers") that attract and kills flying insects that are attracted by light. A light source attracts insects to an electrical grid, where they are electrocuted by touching two wires with a high voltage between them. In one aspect, the electrical grid is housed in a protective cage or shroud of plastic, grounded metal bars, or some other material, to prevent people or animals from touching the high voltage grid. A first light source is located inside the protective shroud and is designed to emit both visible and ultraviolet light. In one aspect, the distance between adjacent wires ranges from 2 mm to 5 mm. A high-voltage power supply powered by mains electricity, which may be a simple transformerless voltage multiplier circuit made with diodes and capacitors, generates a voltage high enough to conduct through the body of an insect which bridges the two grids, but not high enough to spark across the air gap. Enough electric current flows through the small body of the insect to heat it to a high temperature and exterminate it. In one aspect, the voltage level ranges from about 500 to 600 volts.

In one aspect of the technology, the electrical grid and the first light source are placed in an extendable portion of a collapsible device. A back end of the device comprises a cavity for housing a power source and electrical circuitry. A front end of the device comprises a forward directed light. Advantageously, when the device is in an "open" configuration an electrical grid and grid light source are exposed and can function as lateral lighting and/or an insect extermination device. When the device is in a "closed" configuration, the insect extermination and lateral lighting components are enclosed within the device after being slidably disposed therein. However, the front end light is operable as a conventional flashlight device or may include a diffuser to create an area light. The lighting and electrical grid operational options are all operable from a single control switch.

With reference to FIGS. 1 through 7, one example of an insect extermination/lighting device that may employ the current technology is disclosed. The device is generally shown at 30 in FIGS. 1 through 7. In FIGS. 1 through 6, the device 30 is shown in an open position. A first housing or shroud 10 comprises an open end in communication with a cavity. The cavity is configured to house and enclose an electrical grid (6, 7) therein when the device is in a "closed" position (see, e.g., FIG. 7). Meaning, in a closed (or retracted) position the electrical grid (6, 7) is enclosed in the cavity within housing 10 and in an open (or extended) position, the electrical grid (6, 7) is exposed to the ambient environment.

In one aspect of the technology, the first housing or shroud 10 is coupled to a second housing (or lower shroud) 16 which comprises, for example, a forward directed light assembly or second light source. In one aspect of the technology, the forward directed light assembly comprises an LED 17 (or other light source) coupled to a control switch 14. The LED 17 is housed within a reflector 18 that is secured within the second housing 16 with capture ring 19. A lens 20 is disposed about the distal end of the reflector 18 and is also secured by the capture ring 19. In one aspect of the technology, the capture ring 19 comprises a plurality of magnets configured to allow the user to couple the device 30 to a ferrous surface. For purposes of describing the figures, housing 10 and a housing 16 are described. However, it is understood that the forward directed light assembly (or second light source) can be located in the same housing as the cavity that houses the electrical grid (6,7) when the device is in a closed configuration.

In one aspect of the technology, when the device 30 is in an open position, the device 30 is intended to be placed on a flat surface such that the capture ring 19 and/or lens 20 are adjacent the flat surface. The flat surface may be a table top or ceiling (i.e., a horizontal surface) or a wall (i.e., a vertical surface) wherein the device 30 is affixed. In an open or extended position, the slidable portion of the device 30 is extended from the cavity within housing 10. In another aspect, however, when the device 30 is in an open configuration, the device 30 is hung by handle 11. In this manner the device 30 may be in an open position wherein the first light (i.e., the UV and/or white light LED combination) is operable and the second light (i.e., the forward-directed white light LED) is operable. In one aspect, the lens 20 comprises a diffuser intended to soften the light emitted from the second light source disposed about a bottom of the device 30. It is important to note that the reference to "forwarded-directed white light LED" is a relative term based on the use of the device. When the device 30 is in a closed configuration, the second light source acts as a general purpose flashlight wherein the user points the device 30 in a direction that he/she wishes to illuminate. Thus, the second light source is "forward-directed." However, in another aspect, when the device is hung, the second light source may be "downward directed."

In one aspect of the technology, a top portion of the device 30 comprises an upper shroud or upper housing 2 that is fixed to the electrical grid (6, 7). The upper shroud 2 comprises a cavity that houses a light control board 3 and an open space for placement of a power source for powering the device 30. While the cavity within the upper housing 2 is intended to house a portable power source (e.g., conventional or rechargeable batteries), the upper housing 2 is also configured to be coupled to a fixed external power source (e.g., an outlet). In another aspect, the power source located within the upper housing 2 is coupled to an external power port intended to charge an external device such as a mobile phone. In this aspect, the portable power source used to power the device 30 can also be used as a "power bank" for other external devices. While a cavity for the power source and power source are described as being located in the upper shroud 2, it is understood that the power source may also be located in the first housing 10 or second housing 16.

A cap 1 is disposed atop the open space of the upper shroud 2. The upper housing 2 is fixedly attached to an electrical grid/lateral light assembly. The electric grid/lateral light (i.e., the first light source) assembly comprises a lighting control shroud 4 that houses an electrical control assembly for powering the electrical grid and the first light source (i.e., the UV and/or white light LED combination). A bottom portion of the control shroud 4 comprises a plurality of LED lights disposed about the perimeter of the shroud 4. In one aspect, the LED lights comprise a plurality of white LED lights and UV LED lights that are on a separate control switch and may be turned on and off independently of one another. In another aspect, the LED lights comprise a plurality of individual LEDs that are configured to emit both a beam of white light (about 400 nm to about 720 nm) in a first mode and/or a beam of UV light (about 315 nm to about 400 nm) in a second mode. While white and UV light LEDs are specifically referenced with a specified wavelength, it is understood that LEDs having numerous other wavelengths (or subsets of the stated UV and white wavelengths) of light may be used herein as suits a particular purpose.

In one aspect of the technology, the LED lights are positioned such that a bottom plane of the LED lights is parallel with a bottom plane of the lens 20 and/or the reflector ring 19. In this orientation, the LED lights propagate light downward in a direction that is parallel with a longitudinal direction of the device 30. The LED lights also propagate light laterally in a direction that is not parallel with a longitudinal direction of the device 30 providing area light to users of the device 30 as well as an amount of UV light to attract insects. In one aspect of the technology, the light control board 3 and lighting control shroud 4 are configured such that a bottom portion of the control shroud 4 is adjacent a top portion of housing 10 when the device 30 is in a closed configuration. However, in an additional aspect of the technology, the light control board 3 and/or lighting control shroud 4 are located beneath the electrical grid (6, 7) instead of above it. In this aspect, the light assembly is configured to emit light upward and outward instead of downward and outward. In one aspect, a lighting control shroud 4 is located above and below the electrical grid (6, 7). In another aspect, LED lights are located inside the electrical grid (6, 7) and oriented such that the LEDs emit light generally outward.

In an additional aspect of the technology, the UV LEDs are configured with pulse-width modulation ("PWM") to "dim" the UV LED while still attracting insects that are attracted to certain frequencies of UV radiation. PWM is one way of regulating the brightness of a light. In some aspects, using different degrees of PWM may attract different insects. Thus, in one geography a user may select a first PWM mode and in a different geography a user may select a second PWM mode. In one aspect, light emission from the LED is controlled by pulses wherein the width of these pulses is modulated to control the amount of light perceived by the end user. When the full direct current voltage runs through an LED, the maximum of light is emitted 100% of the time. That is, the LED emits light 100% of the time when in an "on" mode. With PWM, the voltage supplied to the LED can be "on" 50% of the time and "off" 50% of the time so that the LED gives off its maximum amount of light only 50% of the time. This is referred to as a 50% duty cycle. In this scenario, if the on-off cycle is modulated fast enough, human eyes will perceive only half the amount of light coming from the LED. That is, with such an input on the LED, the amount of light given off appears diminished by 50%. While specific reference is made to a 50% duty cycle, the LED duty cycle of the light sources described herein (UV and/or white LED, etc.) may be greater or lesser than 50% as suits a particular purpose. For example, the UV LED may have a duty cycle that ranges from 25% to 40%, 40% to 50%, 50% to 60%, or 60% to 75%.

In one aspect of the technology, the on-off cycle (i.e., the rate at which the LEDs are turned on and off) is greater than about 80 to about 100 MHz. In another aspect, the on-off cycle is greater than about 100 MHz to about 120 MHz. In another aspect of the technology, the on-off cycle ranges from about 10 to about 200 KHz. In another aspect, the on-off cycle ranges from about 1 KHz to about 20 KHz. Advantageously, the device 30 can be operating in a "dimmed" UV mode while either still providing LED white light or with the perception of little to no UV light at all. The device 30 can also be operated in a "dimmed" white light LED mode with little or no UV light being perceived. That is, the duty cycle of the UV LED may be 100% while the duty cycle of the white light LED is less than 100% or vice versa. In addition, both lights may be operated at 100% of the duty cycle or both may be operated at less than 100% of the duty cycle. Reference may be made herein to LED lights that are not pulse width modulated. Most LED lights will not be operated in a static mode, meaning they will not truly be without any pulse width modulation. For purposes of this application, an LED light is effectively static or effectively without pulse width modulation if it is modulated at a frequency less than bout 2 KHz.

The electrical grid/lateral light assembly further comprises a core 22 made of a metal, ceramic, or polymeric material. The core 22 is coupled to a center of the control shroud 4 and extends downward from the control shroud 4. In one aspect of the technology, the core 22 is cylindrical on a top end and expends outward in a circular orientation toward its bottom end to couple with an internal frictional guide 9 within the cavity of bottom shroud 10. A plurality of electrical grids (6,7) are disposed concentrically about the core 22 and are electrically coupled to shroud 4. The inner grid 6 and outer grid 7 are electrically charged and act as the insect-heating component (i.e., the bug zapper) of the device 30. In one aspect, the grids comprise a mesh or crisscrossing pairs of wires forming a parallelogram-shaped mesh opening ranging from about 3 to about 5 mm wide between wires. Other shaped grids (e.g., circular, triangular, or simple linear bars) may be used as suits a particular design. While two grids are shown, a single grid or more than two grids may be used as suits a particular purpose.

An enclosure 5 is disposed about the exterior of shroud 4 and the core 22 enclosing the electrical grid/lateral light assembly. In one aspect, the enclosure 5 comprises a plurality of transparent bars with spaces there between to optimize lateral light transmission from the device 30 while allowing insects smaller than about 10 mm to travel through the enclosure 5 to the inner and outer grids 6, 7 for extermination. In another aspect, the enclosure 5 comprises a plurality of opaque slats ranging from about 3 to 8 mm in width. The slats are oriented longitudinally about the perimeter of the electrical grid (6, 7) and have a longitudinal space between adjacent slats ranging from about 5 mm to about 10 mm in width. In one aspect, the first and second light sources are substantially water-tight and are enclosed by a lens. Meaning, the first and/or second lights sources are not open to ambient environment. However, the electrical grid 6, 7 must be open to the ambient air to serve its purpose of exterminating insects.

In another aspect of the technology, one or more capsules, pads, or other delivery mechanisms containing octanol (or other biting insect attractants) may be coupled to the enclosure 5. In one aspect, the device 30 is packaged with biting insect attractants that may be placed inside the enclosure 5 from time to time as suits a particular user. The enclosure 5 may comprise a variety of different shapes and/or orientations and may be made from a variety of different materials (metal, plastic, etc.).

FIG. 7 shows the device 30 of FIGS. 1-6 in a closed position. In the closed position, the upper housing 2 is pushed toward the lower housing 10 causing the electrical grid/lateral light assembly to slide into the cavity within lower shroud 10. The device 30 comprises a dual-position handle 11 having a clip 12 on opposite ends of the handle. When the device 30 is in an open position, clips 12 are configured to mate with clip mounts 12a and 12b disposed on opposing sides of the upper housing 2. In this manner, the device 30 may be held from the top of the device. When the device 30 is in a closed position, the clip 12 is disengaged from clip mount 12b and is instead coupled to clip mount 12c. In this manner, the device 30 can be held as a conventional flashlight.

In accordance with one aspect of the technology, the first and second light sources and electrical grids (6, 7) are controlled by switches. For example, one of the switches is a mechanical reveal switch. In a first position the switch indicates to the programmable logic control system that the insect extermination/lighting device is in a closed position, thus indicating that the non-revealed lighting element and electrical grid should not and/or cannot be activated. In a second position, the switch will indicate to the control system that the device is in open (or extended) position, thus indicating that the lighting element(s) and the electrical grid are now revealed and may or may not be activated—depending on the activation of either software or logic controlled switches or the mechanical switch. In one aspect, the UV LED (or UV mode of multi-mode LED) is activated concurrently with activation of the electrical grids 6, 7. The white LED may also be activated while leaving the UV LED and electrical grids on, by cycling through the switch. Generally speaking, when the device is in an open configuration, cycles of the switch comprise a first cycle where the electrical grids/UV LED is activated, a second cycle where the electrical grids/UV LED and white LED are activated, a third cycle where the white LED is activated in high mode and the electrical grids/UV LED are inactive, a fourth cycle where the white LED is activated in a low mode and the electrical grids/UV LED are inactive, and a fifth cycle when the device is in an inactive state. When in a closed configuration, the forward directed LED 17 may be in an inactive state, a lower power mode, or a high power mode.

Figure 9:
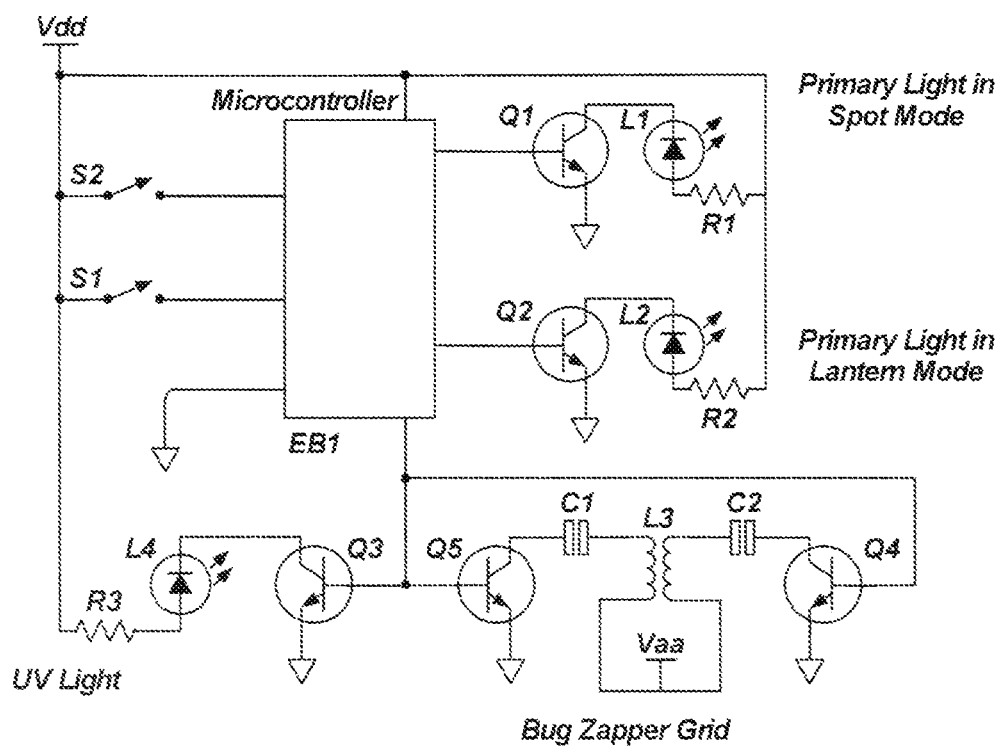
FIG. 9 is an electrical schematic in accordance with one aspect of the technology.

FIG. 9 represents an electrical schematic in accordance with one aspect of the technology. Two mechanical switches S1 and S2 are disclosed, where S2 is dependent on S1 for power. In one aspect, S2 is the reveal mechanical switch. However, even if the housing 2 is extended, (i.e., such that the first light source is exposed), the first light source will not activate unless S1 is active. In one aspect, S1 is a variable voltage switch (e.g., an internal potentiometer) which allows for dimming of either lighting element. A microprocessor may be used to support the mechanical switches S1 and S2, but with an additional control via software controlled (S3) switches that are part of the output control ports in the microprocessor. The software allows the manufacturer of the device 30 to make any of the switches subject to the other.

A method of operating a multi-use lighting device is also disclosed. The method comprises obtaining a lighting apparatus capable of operation in at least an open configuration and a closed configuration, wherein when the apparatus is in an open configuration (i) a first light source, second light source, and electric grid are viewable, (ii) the first light source and second light source are not in contact with ambient air about the apparatus, and (iii) the electric grid is in contact with ambient air about the apparatus. When the apparatus is in a closed configuration, the first light source and electrical grid are concealed within a cavity in the lighting apparatus. The method further comprises configuring the lighting apparatus for operating in an open configuration by slidably removing the first light source and electric grid from a cavity within the lighting apparatus. It also comprises configuring the lighting apparatus for operating in a closed configuration by slidably disposing the first light source and electric grid within the cavity in the lighting apparatus.

The method further comprising modulating the first beam of light propagated from the first light source ranging from about 315 nm to about 400 nm at a rate greater than about 80 MHz to about 100 MHz or greater than about 100 MHz to about 120 MHz. It also comprises simultaneously modulating a second beam of light propagated from the first light source ranging from about 400 nm to about 720 nm at a rate greater than about 80 MHz to about 100 MHz or greater than about 100 MHz to about 120 MHz at a duty cycle that is greater than the duty cycle of first beam of light. In one aspect, the method comprises simultaneously propagating beam of light from the first light source ranging from about 400 nm to about 720 nm that is not pulse width modulated and/or operating simultaneously operating the second light source.

In another aspect of the technology, the method comprising modulating the first beam of light propagated from the first light source ranging from about 315 nm to about 400 nm at a rate greater than about 1 KHz to about 20 KHz or greater than about 20 KHz to about 100 KHz. It also comprises simultaneously modulating a second beam of light propagated from the first light source ranging from about 400 nm to about 720 nm at a rate greater than about 1 KHz to about 20 KHz or greater than about 20 KHz to about 100 KHz at a duty cycle that is greater than the duty cycle of first beam of light.

It is noted that no specific order is required in any disclosed methods of use unless required by the claims set forth herein, though generally in some embodiments, the method steps can be carried out sequentially.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A handheld lighting apparatus, comprising:
   a top housing coupled to a first light source and an electrical grid configured to distribute a quantity of electricity to an object that contacts adjacent portions of the grid, the top housing being slidably mounted to a bottom housing having a cavity therein, the cavity being configured to receive the electrical grid assembly therein,
   wherein the first light source emits light ranging from about 400 nm to about 720 nm in a first mode and light ranging from about 315 nm to about 400 nm in a second mode;
   an enclosure disposed about the electrical grid assembly configured to permit passage of insects through portions of the enclosure;
   a second light source disposed about the bottom housing configured to propagate light in a direction that is parallel to a longitudinal direction of the lighting apparatus;
   a power source coupled to the first and second light source and the electric grid; and
   a programmable logic control system coupled to a switch and the power source, the control system configured to operate the first light source such that light propagated from one or more LEDs of the first light source ranging from about 315 nm to about 400 nm is pulse width modulated at a rate greater than about 20 KHz while light propagated from one or more LEDs of the first light source ranging from about 400 nm to about 720 nm is not pulse width modulated or is pulse width modulated at a rate below 2 KHz.

2. The handheld lighting apparatus of claim 1, wherein the first light source comprises a plurality of LEDs mounted in the top housing, the plurality of LEDs oriented with a face of the LEDs in a direction that is parallel with a longitudinal axis of the lighting apparatus.

3. The handheld lighting apparatus of claim 1, wherein the first light source is disposed adjacent the electrical grid.

4. The handheld lighting apparatus of claim 1, wherein the electrical grid comprises an outer grid and an inner grid disposed about a central core.

5. The handheld device of claim 1, where the electrical grid is shaped to approximate a cylinder.

6. The handheld device of claim 5, wherein the electric grid enclosure comprises a plurality of transparent bars disposed circumferentially about the electrical grid.

7. A handheld lighting apparatus, comprising:
   an open configuration comprising a top housing coupled to a first light source and an electrical grid configured to distribute a quantity of electricity to an object that contacts adjacent portions of the grid, the electrical grid partially enclosed by a protective enclosure configured to permit objects smaller than approximately 10 mm therethrough, the top housing being slidably mounted to a bottom housing having an opening and a cavity therein, the cavity being configured to receive the electrical grid assembly and enclosure through the opening;
   a closed configuration wherein the electrical grid is slidably disposed within the cavity in the bottom housing;
   a second light source disposed about the bottom housing opposite the opening of the bottom housing;
   a power source coupled to the first light source, second light source, and electrical grid
   wherein the first light source is configured to emit a beam of light ranging from about 400 nm to about 720 nm in a first mode, a beam of light ranging from about 315 nm to about 400 nm in a second mode, and a beam of light ranging from about 400 nm to about 720 and a beam of light ranging from about 315 nm to about 400 nm in a third mode and wherein the beam of light ranging from about 315 nm to about 400 nm is pulse width modulated at greater than about 20 KHz to about 100 KHz.

8. The handheld lighting apparatus of claim 7, a switch coupled to the power source configured to prevent power from being provided to the first light source and the electrical grid when the lighting apparatus is disposed in a closed configuration.

9. The handheld lighting apparatus of claim 7, wherein the first light source is disposed adjacent the opening of the bottom housing when the apparatus is in a closed configuration.

10. The handheld lighting apparatus of claim 7, wherein the first light source is disposed adjacent the opening of the bottom housing when the apparatus is in an open configuration.

11. The handheld lighting apparatus of claim 7, wherein the beam of light ranging from about 315 nm to about 400 nm is pulse width modulated at a duty cycle ranging from 25% to 75%.

12. The handheld lighting apparatus of claim 7, wherein the first light source is disposed within the electrical grid.

13. A method of operating a handheld lighting apparatus, comprising:
   obtaining a lighting apparatus capable of operation in at least an open configuration and a closed configuration, wherein when the apparatus is in an open configuration (i) a first light source, second light source, and electric grid are viewable, (ii) the first light source and second light source are not in contact with ambient air about the apparatus, and (iii) the electric grid is in contact with ambient air about the apparatus, wherein when the apparatus is in a closed configuration, the first light source and electric grid are concealed within the cavity in the lighting apparatus;
   configuring the lighting apparatus for operating in an open configuration by slidably removing the first light source and electric grid from a cavity within the lighting apparatus;
   configuring the lighting apparatus for operating in a closed configuration by slidably disposing the first light source and electric grid within the cavity in the lighting apparatus; and
   modulating a first beam of light propagated from the first light source ranging from about 315 nm to about 400 nm at a rate greater than about 2 KHz to about 20 KHz.

14. The method of claim 13, further comprising simultaneously modulating a second beam of light propagated from the first light source ranging from about 400 nm to about 720 nm at a rate greater than about 2 KHz to about 20 KHz at a duty cycle that is greater than the duty cycle of first beam of light.

15. The method of claim 13, further comprising simultaneously propagating beam of light from the first light source ranging from about 400 nm to about 720 nm that is not pulse width modulated or is pulse width modulated at a rate below 2 KHz.

16. The method of claim 13, further comprising simultaneously operating the second light source.

* * * * *

UNITED STATES PATENT AND TRADEMARK OFFICE
CERTIFICATE OF CORRECTION

PATENT NO. : 10,188,091 B2  
APPLICATION NO. : 15/995426  
DATED : January 29, 2019  
INVENTOR(S) : Prieto et al.

Page 1 of 1

It is certified that error appears in the above-identified patent and that said Letters Patent is hereby corrected as shown below:

On the Title Page

Item (12), should read: Prieto et al.

Item (72), Inventor(s) should read: Jimmy Prieto, Grand Prairie, TX (US); Gregory Lee Horne, Euless, TX (US)

Signed and Sealed this  
First Day of July, 2025

Coke Morgan Stewart  
*Acting Director of the United States Patent and Trademark Office*